April 16, 1935. C. R. BOOTHBY 1,997,673
THERMOSTATIC PROTECTION FOR MOTORS
Filed Dec. 28, 1933
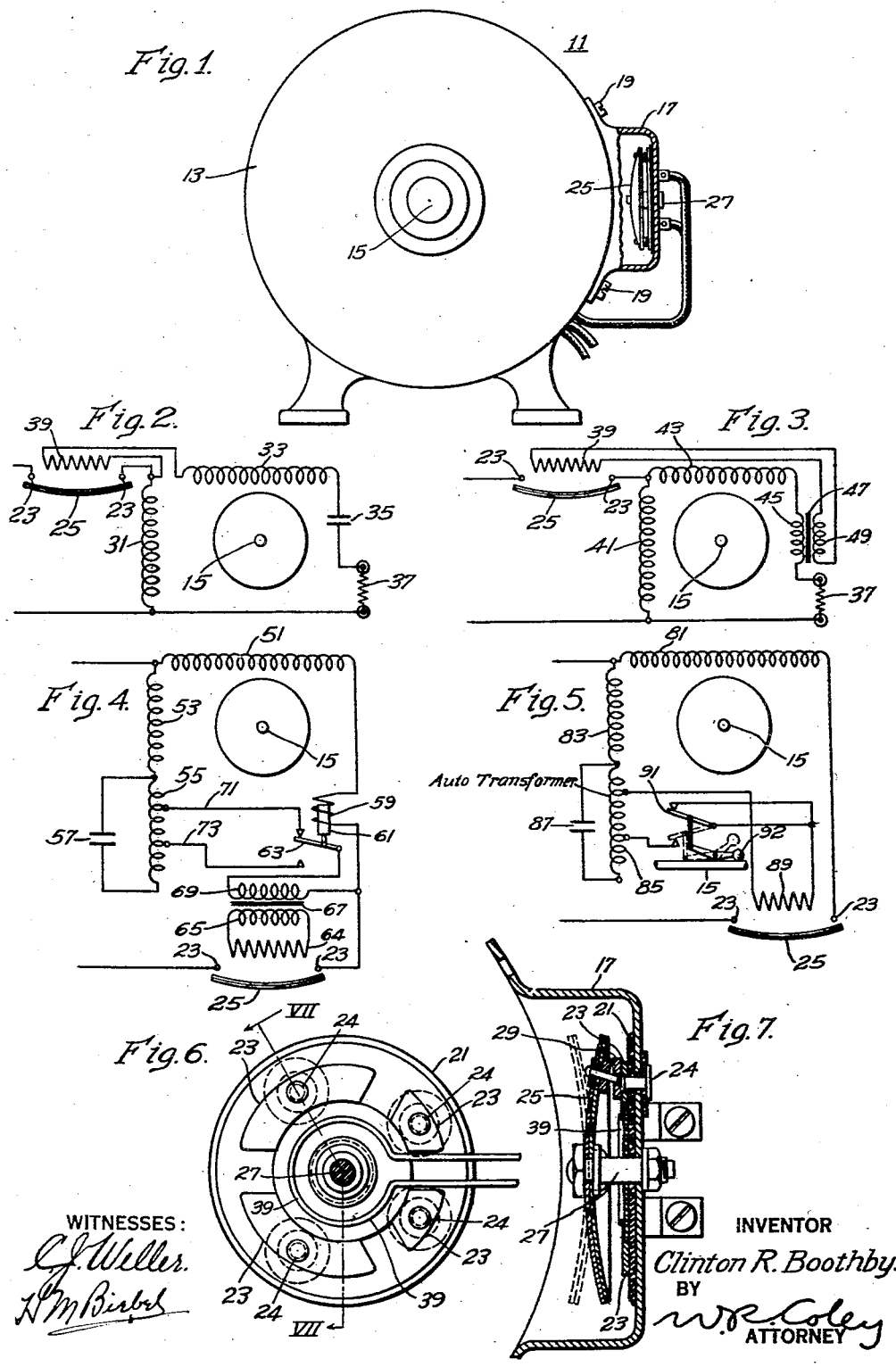
WITNESSES:
INVENTOR
Clinton R. Boothby.
BY
ATTORNEY Patented Apr. 16, 1935

1,997,673

UNITED STATES PATENT OFFICE 1,997,673

THERMOSTATIC PROTECTION FOR MOTORS

Clinton R. Boothby, Springfield, Mass., assignor to Westinghouse Electric & Manufacturing Company, East Pittsburgh, Pa., a corporation of Pennsylvania Application December 28, 1933, Serial No. 704,303

6 Claims. (Cl. 172—279)

My invention relates to protective devices and systems and particularly to means for thermally protecting an alternating-current motor starting under plural phase conditions.

It is an object of my invention to provide a device that shall protect, for instance, a split-phase alternating-current motor not only during the starting period thereof but also during operation thereof.

Another object of my invention is to provide a thermal protective device for alternating-current motors of the so-called capacitor type.

In practicing my invention, I provide a thermally actuable switch which may be located in heat-interchanging relation with an alternating-current motor and which is provided with a small heating element traversed by the current traversing one of the phase circuits of the motor to cause actuation of the switch to its open position in case of abnormal energizing current.

In the single sheet of drawing:

Figure 1 is a view in end elevation of a motor assembly with which is operatively associated the device embodying my invention;

Fig. 2 is a schematic diagram of connections showing my device as associated with a split-phase capacitor motor;

Fig. 3 is a diagram of connections of my device as applied to a split-phase motor showing a modified form of control, Fig. 4 is a diagram of connections of a plural-value capacitor motor, Fig. 5 is a diagram of connections of a plural-value capacitor motor showing a modified form of connecting the device embodying my invention, Fig. 6 is a top plan view of a thermostatic switch base, and Fig. 7 is a section through a thermostatic switch embodying my invention taken on the line VII—VII of Fig. 6.

In applications of fractional horse-power motors it may happen that the motor is called upon to either start its load or at least to try and start its load under abnormally heavy torque conditions. Insofar as I am aware, none of the ordinary thermally actuable switches used on motors will take care of running conditions as well as of starting conditions involving abnormally heavy current which may, of course, cause a burnout of the motor windings if permitted to traverse the windings for too long a period of time. In order to point out one such condition, by way of example, I may refer to refrigerator compressor drives, where in case of a fault in the refrigerating system it is possible for the motor to be called upon to start the compressor under abnormal conditions which may, in fact, stall the motor. The device embodying my invention is particularly useful in an installation of this kind to protect the motor but it is also useful in protecting against abnormal overload running conditions.

Referring first to Fig. 1 of the drawing, I have there illustrated a motor assembly 11 which may be considered as including a peripheral housing for the stator and stator winding and a plurality of bearing brackets 13, only one of which is shown in Fig. 1 of the drawing, as well as a rotor structure which is indicated generally only by reference character 15 applied to a rotor shaft.

The device embodying my invention is shown in section in Fig. 7 of the drawing and includes a dished housing 17 whose inner edge is of such contour as to closely operatively fit against the housing of motor 11, a plurality of small machine screws or escutcheon pins 19 being provided to hold it in such position.

A sheet 21 of electric insulating material, such as mica, is located against the inner face of dished member 17 and a plurality of fixed contact members 23 are located against the inner face of plate 21 and are held thereagainst by any suitable means, such as rivets 24.

A snap acting bimetal disk 25 is operatively supported by member 17 as by a stud 27 on the inner end of which the disk 25 is loosely mounted in any manner now well-known in the art. The disk 25 is in general of the kind disclosed and claimed in Patent No. 1,448,240 to J. A. Spencer. The disk 25 may occupy any one of two opposed limiting positions, one of which is that in which contact members 29 insulatedly supported adjacent the periphery of disk 25 are in engagement with the fixed contact members 23 to close an energizing circuit of motor 11. From this position, the disk 25 can move with a snap action to the position shown by the broken lines in Fig. 7 of the drawing when the temperature rise of the disk exceeds a predetermined value and in which actuated position the movable contact members 29 will be out of engagement with fixed contact members 23, so that an electric circuit controlled thereby will be deenergized.

Referring now to Fig. 2 of the drawing, I have there illustrated generally a motor 15 having a continuously energized main winding 31, and an auxiliary winding 33 which is energized only during the starting period of the motor. I have illustrated further a condenser 35 connected in series circuit with winding 33 as well as a centrifugally actuable circuit-interrupting switch 37 which is shown generally only but is to be understood as being mounted on the rotor to be operated thereby and to open the circuit of auxiliary winding 33 and capacitor 35 at a predetermined speed of the rotor which is somewhat below the full operating speed. The thermal switch including the casing 17 and the disk 25 is to be understood as being mounted in the same general position as is shown in Fig. 1 of the drawing. That is, it is in heat interchanging or receiving relation with the stator assembly of the motor.

Connected in series circuit relation with auxiliary winding 33 there is provided a small auxiliary heating element 39 which may be secured in any suitable or desired manner against the outer face of the electric insulating plate 21 and in heat radiant relation to disk 25. The same current that traverses the auxiliary winding circuit including winding 33 and capacitor 35 will, therefore, traverse the heating element 39 which will be heated thereby in proportion to the current traversing this circuit and will therefore, thermally actuate the disk 25. Thus, if a motor of the capacitor-start type shown schematically in Fig. 2 of the drawing is called upon to start under abnormally heavy overload conditions which might otherwise cause overheating of the motor energizing circuits and a burning out thereof, the abnormally large current traversing heating element 39 will quickly cause a rise in temperature of the disk 25 and its operation to the position shown by the broken lines in Fig. 7 of the drawing whereby the energizing circuit of the motor will be interrupted.

The heating element 39 will, of course, be rendered inoperative by reason of the actuation of the centrifugal switch 37 to a position interrupting the circuit of the auxiliary winding, but the thermal switch will still be operative to protect the motor under abnormally heavy overload conditions; as the heat generated in the main winding 31 and the iron losses in the stator will cause a rise in temperature of the housing of the motor and a consequent rise in temperature of disk 25 which, if large enough, will cause it to operate to thereby interrupt the energizing circuit of the motor, thereby protecting the same. I find it possible to so design the various elements of the device embodying my invention and more particularly the heating element 39 in its relation to the disk 25 as to be able to protect a motor of this type not only during starting but also during running conditions.

Referring to Fig. 3 of the drawing, I have there shown a somewhat different type of connections for a motor embodying a rotor 15, a main winding 41 and an auxiliary winding 43, the auxiliary winding in this and in the other motors discussed being, of course, located in a phase-displaced position on the stator relatively to the main winding.

The circuit of the auxiliary winding 43 includes the primary coil 45 of a small current transformer including, in addition to the primary winding 45, a core 47 and a secondary winding 49, which secondary winding is connected in circuit with and energizes an auxiliary heating element 39, as was hereinbefore described in connection with Fig. 2 of the drawing. The auxiliary circuit includes also a centrifugally actuable switch 37 which is shown schematically only and is to be understood as mounted or actuated by the rotor 15 to interrupt the circuit of the auxiliary winding 43 at some predetermined speed somewhat below the normal operating speed of the motor.

The current through the heating element 39 of Fig. 3 need not, therefore, be the same as that traversing the auxiliary winding circuit but it may be proportional, and may have any desired ratio relative thereto.

Referring now to Fig. 4 of the drawing, I have there illustrated schematically an electromagnetically controlled plural-value capacitor motor. The motor includes a rotor 15, a main winding 51 and an auxiliary winding 53. The auxiliary winding 53 is connected to the coil 55 of an auto-transformer shown generally only by winding 55, a condenser 57 being electrically connected to the terminals of transformer 55.

The circuit of the main winding includes a coil 59 of an electromagnet including also a movable core 61, which movable core is adapted to actuate a switch arm 63 from one position to another position. The circuit includes also a thermally actuable switch such as has already been described and including a disk 25 and fixed and movable contact members. An auxiliary heating element 64 is provided in heat radiating relation to disk 25 but this auxiliary heating element is energized by the secondary winding 65 of a small current transformer including, in addition to the secondary winding 65, a suitable core 67 and a primary winding 69, which, as shown in Fig. 4 of the drawing, is connected in circuit with the pivotally mounted switch arm 63. A pair of taps 71 and 73 are provided on the auto-transformer 55 and the connections between the taps 71 and 73 and the switch arm 63 is such that upon energizing the motor, the relatively large starting current traversing the main-winding circuit and, therefore, the coil 59 of the electromagnet, will cause core 61 and arm 63 to move upwardly to connect primary 69 of the current transformer in series circuit with tap 71, whereby a higher voltage is provided for or on the condenser 57 thereby resulting in improved starting conditions. As soon as the motor is at or near its normal operating speed, the current in the main winding circuit is reduced to such an extent that the core is permitted to drop, whereby switch arm 63 is connected to tap 73, so that the motor will operate under suitable running conditions with a lower voltage applied to the condenser 57.

It will be noted that in the diagram of connections illustrated in Fig. 4 of the drawing, the auxiliary heater 69 is connected in circuit not only during starting conditions but also during running conditions.

The current traversing the auxiliary winding under normal running conditions is so much less than it is under locked rotor conditions that it will not generate enough heat in the auxiliary heater 39 or 64 to trip the thermostat, which will therefore, under running conditions, operate to deenergize the motor when the frame temperature reaches a value previously determined to be the maximum safe value. It has been found to be an advantage to have relatively small and substantially constant current, such as traverses the auxiliary winding under running conditions, traverse the auxiliary heater as it increases the temperature of the thermally actuable switch slightly above that of the frame, thereby reducing the temperature differential between a hot spot in the motor and the thermostat.

Referring now to Fig. 5 of the drawing, I have there illustrated a modified form of a two-value capacitor motor which includes in addition to the rotor structure 15 a main winding 81 and an auxiliary winding 83, and a thermally actuable switch including a disk 25, whereby to control the energizing circuit of the motor. I provide an auto-transformer 85 and a condenser 87 connected substantially as was hereinbefore discussed in connection with Fig. 4 of the drawing. An auxiliary heating element 89 for the thermal switch is so connected as to be energized by the starting current only as by means of a speed-controlled transfer switch 91 which is shown generally only in this figure of the drawing as being actuated by a weight 92 pivotally mounted on the rotor shaft 15 and connected to the switch arm 91 to move the same in accordance with the speed of the rotor. When the motor is standing still or is operating at low speeds, the transfer switch 91 connects auxiliary heater 89 in circuit with a small part only of the auto-transformer 85 (which position is shown by the full lines in Fig. 5) and after the motor has reached almost its normal running speed, the switch is moved to the position shown by the broken lines in Fig. 5, whereby the auxiliary heater 89 is cut out of circuit and the voltage on condenser 87 is reduced in a manner well-known in the art.

The operation of the device embodying my invention and as shown in Figs. 3 and 5 of the drawing, is substantially the same as that hereinbefore explained in connection with Fig. 2 of the drawing. That is, the auxiliary heater operatively associated with the thermal switch is deenergized after starting of the motor has been effected, and operation of the disk 25 is effected only by heat generated in the rotor stator lamination and stator winding and transmitted to the disk 25 through the housing of the motor assembly. In Fig. 4 of the drawing, however, the connections are such that the auxiliary heater either as shown in that figure of the drawing connected in circuit with a current transformer or directly in the circuit is energized not only during the starting period but also during the running period of the motor.

As has already been hereinbefore set forth, I have found it possible to so correlate the design conditions of the thermal switch and of the motor as to obtain protection for the motor not only during the starting thereof but also during the running thereof. It may be pointed out here that the current traversing the auxiliary winding circuit, under the starting connection of a capacitor motor of the kind shown in Fig. 2 of the drawing will be on the order of six to eight times the running current in the capacitor phase. If the capacitor phase is permitted to remain energized continuously, there is thus available a relatively heavy starting current in the auxiliary phase not only of a capacitor motor but also of a split phase motor which if unduly prolonged by reason of extreme overloads under the locked rotor conditions or otherwise, will quickly raise the temperature of the thermal element of the switch and cause interruption of the energizing circuit of the motor whereby the motor is properly protected.

Various modifications may be made in the device embodying my invention without departing from the spirit and scope thereof, and I desire, therefore, that only such limitations shall be placed thereon as are imposed by the prior art or are set forth in the appended claims.

I claim as my invention:

1. In combination with an electric motor having a plurality of phase-displaced energizing windings and means for deenergizing one of said windings after starting, a thermal switch controlling the energization of the motor and a heating element in heat-transferring relation to the thermal switch connected in series circuit with that winding which is deenergized after starting of the motor.

2. In combination with an electric motor having a different number of phase-displaced energizing windings operative during starting and during running conditions, a thermally-actuable switch controlling the energization of the motor, located in direct heat-receiving relation to the motor and having a heating element in heat-transferring relation thereto connected in series circuit with only one of said energizing windings.

3. In combination with an electric motor having a continuously operative main energizing winding and a discontinuously operative auxiliary energizing winding, a thermally-actuable switch controlling the energization of the motor and means for actuating the switch during the starting operation of the motor by heat generated by an electric current traversing the discontinuously operative winding and during running operation of the motor by heat generated in the continuously operative winding.

4. In combination with an electric motor having a frame including a stator, a continuously operative main energizing stator winding and a discontinuously operative auxiliary energizing stator wnding, a thermally-actuable switch controlling the energization of the motor, means to secure it on the frame of the motor to be affected by heat therein and a heating element in heat-transferring relation to the switch and traversed by the current in the discontinuously operative winding.

5. In combination with an electric motor comprising a frame including a stator, a main and an auxiliary energizing winding thereon, a centrifugally operable switch to deenergize the auxiliary winding at a predetermined motor speed, a thermally-actuable switch controlling the energization of the motor and means for actuating the switch during the starting operation of the motor by heat generated by an electric current having a direct ratio to the current traversing the auxiliary winding and during running operation by heat generated in the main winding and in the stator.

6. In combination with an electric motor comprising a frame including a stator and a main and an auxiliary energizing winding on the stator and a thermally-actuable switch controlling the energization of the motor and comprising a casing, means for securing the casing against the motor frame, a bimetal element in the casing having one flat surface in heat receiving relation to the surface of the frame and a heating element in the casing on that side of the bimetal element away from the frame and connected in series circuit with the auxiliary energizing winding.

CLINTON R. BOOTHBY.